3,773,898
Patented Nov. 20, 1973

3,773,898
COMPOUND FERROELECTRIC-FERROELASTIC CRYSTAL
Keiichiro Aizu, Tokyo, Akio Kumada, Kodairo, Hiroshi Yumoto, Kokubunji, Sakichi Ashida, Fuchu, and Yoshio Furuhata, Kodaira, Japan, assignors to Hitachi, Ltd., Tokyo, Japan
Continuation-in-part of abandoned application Ser. No. 38,653, May 22, 1970. This application Aug. 25, 1971, Ser. No. 174,810
Claims priority, application Japan, Aug. 2, 1967; 42/49,674; Sept. 18, 1967, 42/59,450
Int. Cl. C01g 39/00
U.S. Cl. 423—263    4 Claims

ABSTRACT OF THE DISCLOSURE

A compound ferroelectric-ferroelastic crystal defined by the expression $$(R_xR'_{1-x})_2O_3 \cdot 3MO_{1-e}W_eO_3$$

where R and R' are at least one rare earth element, X=0–1.0 and e=0–0.2 and having the gadolinum molybdate crystal structure belonging to the orthorhombic system and the point group mm2. The crystal has unequal $a$ and $b$ lattice constants, wherein $b-a/2a$ is more than $1.0 \times 10^{-3}$, thus exhibiting ferroelectric-ferroelastic properties.

CROSS REFERENCE TO THE RELATED APPLICATION

This application is a continuation-in-part application of U.S. Ser. No. 38,653 filed on May 22, 1970, now abandoned.

BACKGROUND OF THE INVENTION

Field of the invention

This invention relates to a compound crystal having the ferroelectric-ferroelastic property.

Description of the prior art

As is well-known, ferroelectric material has a piezoelectric effect, generating a voltage by an applied mechanical stress or strain or generating a mechanical stress or strain by an applied voltage. Of the materials having the piezoelectric effect lead zircotitanate (hereafter abbreviated as P.Z.T.) has a large piezoelectric effect, which is due to an electric or a mechanical strain induced in the crystal with applied stress or voltage. For example, when a piezoelectric relay is made of P.Z.T. pieces with a length of 20 to 30 mm. and a contact gap of 0.1 mm., the expansion $\Delta n$ by the longitudinal effect (i.e. the applied voltage $V_3$ and the generated strain are in the same direction) is given by $$\Delta n = d_{33} V_3$$

where $d_{33}$ is a constant depending on the material and the direction of voltage. The maximum value of $d_{33}$ of P.Z.T. is $$d_{33} \approx 600 \times 10^{-12} \ (m/V)$$

So, in order to switch a contact gap of the order of 0.1 mm. the voltage $V_3$ must be $$V_3 = \frac{\Delta n}{d_{33}} = 167 \text{ kv.}$$

When P.Z.T. pieces with a lateral length $l=30$ mm. and a longitudinal length $n=0.1$ mm. are employed and their transvere effects (i.e. the applied electric field E and the strain X are perpendicular to each other) are used, in order to yield a lateral strain of the order of 0.1 mm. the voltage $V_3$ must be $V_3=1.11$ kv. as $$\Delta l = d_{31} E_1 l = d_{31} \frac{l}{n} E_{3n} = d_{31} \left(\frac{l}{n}\right) V_3$$

and $$d_{31} \approx 300 \times 10^{-12} \ (m/V)$$

Therefore, it is understood that even if the best P.Z.T. is employed a large driving voltage is required.

After long research on ferroelectric materials it has been found that some e.g. Rochelle salt and potassium dihydrogen phosphate (hereafter abbreviated as KDP) are different from barium titanate in that the application of a stress above a certain value can reverse their spontaneous polarization (i.e. the electric polarization possessed by the material in the spontaneous state). Further, it has been found that the crystal is distorted rapidly with this reversal in polarization causing a kind of creep phenomenon. This anomalous distortion disappears when the polarization reversal is finished. Hysteresis loops are found to be observable between the stress and the polarization (X vs $P_s$), and between the stress and the strain (X vs $x_s$). Also, has been found that the mechano-electrical conversion efficiency due to this novel effect is larger than that of the conventional piezoelectric effect. For example, when the ferroelectric material KDP, Curie point of which is 123° K., is thinly 45° Z cut (i.e. cut in parallel with (011), (010) and (110) surfaces), to fix an electrode on the Z (011) surface of its thin plate, and an ac voltage is applied thereto, a hysteresis is observed between the stress and the voltage in the ferroelectric phase in accordance with the "polarization change." If the thin plate has a length $l$ and the variation in length of thin plate due to the "polarization change" is $\Delta l$, then a spontaneous strain $x_s$ (i.e. the strain possessed by KDP in the spontaneous state) is given by $$\frac{\Delta l}{l} = 2x_s \approx 8 \times 10^{-3}$$

The electric field $E_c$ required for the "polarization change" (hereinafter referred to as the coercive field) is given by $$E_c = 1000 \text{ v./cm.}$$

$$\Delta l = 2d_{31'} \left(\frac{l}{n}\right) V_3$$

and $$V_3 = E_c \cdot n$$

$$\Delta l = 2d_{31} \cdot E_c l$$

When a voltage $V_3=50$ v. is applied to a KDP piece with $l=15$ mm. and $n=0.5$ mm., the variation in length becomes $\Delta l=0.12$ mm. Thus, it is possible to make a piezoelectric relay through the use of the longitudinal effect of KDP. $d_{31}'$ in the above relations is the apparent piezoelectric modulus. Since $$d_{31'} = \frac{\Delta l}{2E_c l} = 40000 \times 10^{-12} \frac{m}{V}$$

$d_{31}'$ is 133 times larger than $d_{31}$ of P.Z.T.

SUMMARY OF THE INVENTION

The general object of this invention is to provide a compound ferroelectric-ferroelastic crystal defined by the expression $(R_xR'_{1-x})_2O_3 \cdot 3Mo_{1-e}W_eO_3$, where R and R' are at least one rare earth element, $x=0\sim1.0$ and $e=0\sim0.2$, with a gadolinium molybdate crystal structure (hereinafter referred to as the GMO crystal structure) belonging to a type $\bar{4}2mFmm2$.

Other objects, features and advantages of the present invention will readily be apparent from the following detailed description of certain preferred embodiments taken in conjunction with the accompanying drawings.

DESCRIPTION OF THE PREFERRED EMBODIMENTS

Explanation of this invention will be made hereinafter with reference to these drawings.

Figure 1:
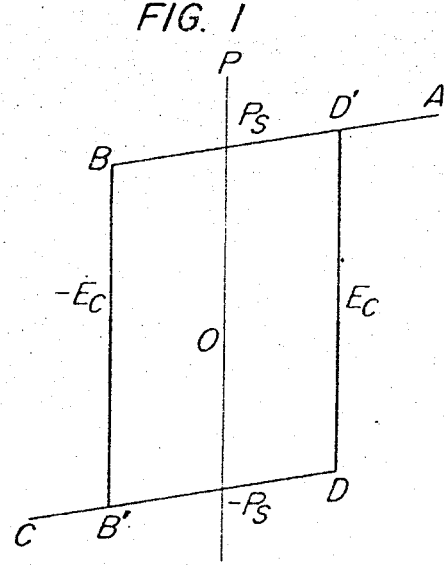
FIG. 1 shows a polarization vs. electric field hysteresis loop of a ferroelectric material.

A ferroelectric material has more than two different orientations of electric polarization in the absence of an electric field and a mechanical stress, and these two different orientations can be subjected to the mutual transition thereof by application of an electric field. It is to be noted here that any two orientation states are identical or enantiomorphous in regard to crystal structure. The ferroelectric material generally displays a polarization (P) vs. electric field (E) hysteresis loop as shown in FIG. 1.

As well-known, the thermodynamic potential $\psi$ of the ferroelectric material under the conditions that the temperature T, the electric field E (vector) and the stress $\vec{X}$ (second rank tensor) are constant is given by $$\psi = u - TS - \vec{E} \cdot \vec{P} + \vec{X} \cdot \vec{x} \quad (1)$$

where $u$ is the internal energy per unit volume, S is the entropy per unit volume, $\vec{P}$ is the electric polarization and $\vec{X}$ is the mechanical strain (second rank tensor) of the crystal.

The ferroelectric material has the following properties.

(a) When $\vec{E}=0$ and $\vec{X}=0$, there are more than two different orientation states $\vec{P}$ with a stable electric polarization. By the application of an electric field $\vec{E}$ of a suitable value the difference of $\psi$ between two states becomes considerably large due to the third term of the right hand side of Eq. 1. This means that the states are unstable. Therefore, we can realize that there is a possibility of transition of two different states by the electric field.

(b) In the absence of an electric field and stress there are more than two orientation states with different strains, the difference of $\psi$ between two states by the application of a mechanical stress $\vec{X}$ of a suitable value becomes considerably large due to the fourth term on the right hand side of Eq. 1. Therefore we can realize that there is a possibility of transition of these two different states by the mechanical stress.

Figure 2:
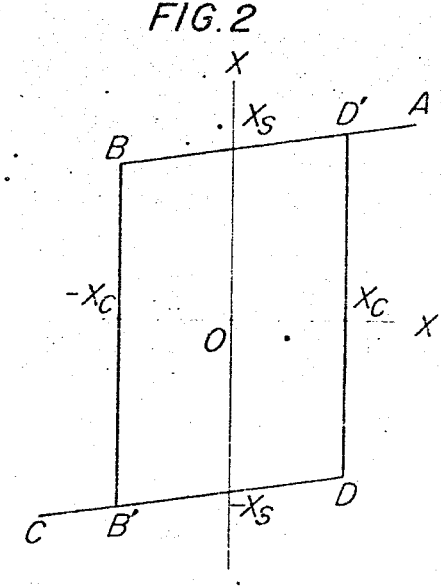
FIG. 2 shows a strain vs. stress hysteresis loop of a ferroelastic material.

Further, the material is called ferroelastic material when it has more than two different orientation states of mechanical strain in the absence of an electric field and a stress and can perform transitions between two different orientation states by a mechanical stress. The ferroelastic material displays a strain ($x$) vs. stress ($X$) square hysteresis loop as shown in FIG. 2. It is to be noted here that any two orientation states are identical or enantiomorphous in respect of the crystal structure.

Figure 3:
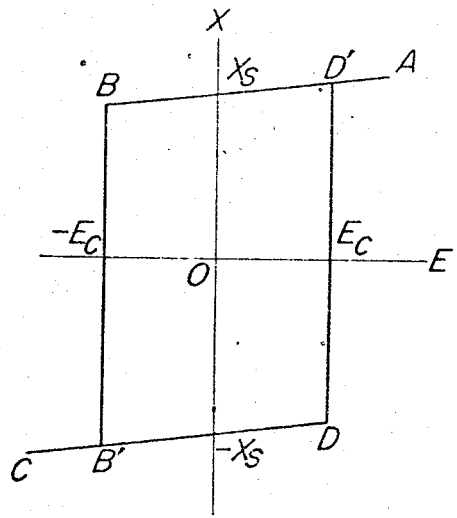
FIG. 3 shows a strain vs. electric field hysteresis loop of a ferroelectric-ferroelastic material.
Figure 4:
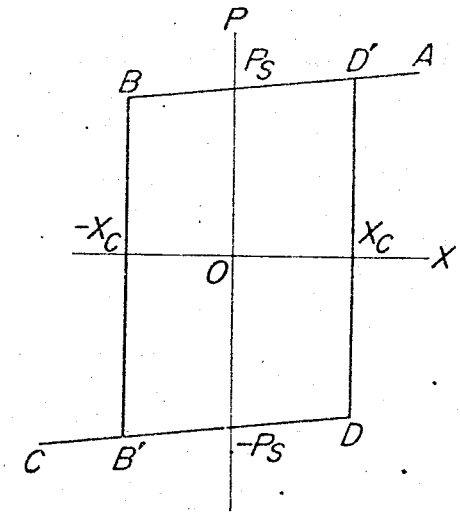
FIG. 4 shows a polarization vs. stress hysteresis loop of a ferroelectric-ferroelastic material.

The material is called "ferroelectric-ferroelastic material" in this specification when it possesses the ferroelectric and ferroelastic properties simultaneously. Transitions between two arbitrary states can be made by either an electric field or a stress. In the absence of a stress the ferroelectric-ferroelastic material displays the electric field vs. electric polarization hysteresis as shown in FIG. 1 as well as the electric field vs. mechanical strain hysteresis as shown in FIG. 3. In the absence of an electric field the material displays the stress vs. strain hysteresis as shown in FIG. 2 as well as the stress vs. electric polarization hysteresis as shown in FIG. 4.

Of the crystals varying their orientation states of polarization by an electric field or a stress some of them suffer a mechanical strain in a unit cell either when the spontaneous polarization is positive (called "0" states) or negative (called "1" state, 180° variation in orientation of electric polarization). A crystal suffering no strain is defined as a regular ferroelectric material while a crystal suffering a strain is defined as an irregular ferroelectric material, the latter being included in the "ferroelectric-ferroelastic material."

Examples of irregular, ferroelectric materials are potassium dihydrogen phosphate (KDP), and gadolinium molybdate, these belonging to the point group mm2 and are expressed by $(R_xR'_{1-x})_2O_3 \cdot 3Mo_{1-e}W_eO_3$ where R and R' are at least one rare earth element, $x=0\sim1.0$ and $e=0\sim0.2$.

In the hysteresis loops shown in FIGS. 1 to 4, the curves AB and CD correspond to orientation states differing one from the other. Half the difference of polarization in the absence of the electric field and mechanical stress is called "spontaneous polarization" $P_S$ while half the difference of mechanical strain is called "spontaneous strain" $x_s$. The curves BB' and DD' corresponding to transient states of transition and electric field $E_C$ and stress $X_C$ needed for these transitions are called "coercive field" and "coercive strain" respectively.

The "ferroelectric-ferroelastic material" generally shows a peculiar phase transition towards the paraelectric-paraelastic phase. When two ferroelectric-ferroelastic materials are the same in regard to their own point group and a corresponding point group of paraelectric-paraelastic phase, they are classified in the same "species." There are 42 species classified in the following Table 1, where the symbol of the point group of the ferroelectric-ferroelastic material is written to the right of the character "F" and the symbol of the point group of the corresponding paraelectric-paraelastic phase is written to the left of "F." The first column shows the species, the second column the number of orientation states possessed by the species, and the third column the material represented by the symbol.

The character "P" in the brackets in column 1 means that the crystallographic principal axis of the ferroelectric-ferroelastic phase is parallel with that of the paraelectric-paraelastic phase (belonging to the noncubic system). The character "S" means that the crystallographic principal axis of the ferroelectric-ferroelastic phase is perpendicular to that of the paraelectric-paraelastic phase (belonging to the noncubic system) or parallel to one of the face diagonals of a cubic lattice of the paraelectric-paraelastic phase (belonging to the non-cubic system).

TABLE 1

| Species | Number of states | Corresponding material | Species | Number of states | Corresponding material |
|---|---|---|---|---|---|
| 2F1 | 2 | | 3mFm | 3 | |
| mF1 | 2 | | 6F1 | 6 | |
| 222F1 | 4 | | 6̄F1 | 6 | |
| 222F2 | 2 | Rochelle salt. | 6̄Fm | 3 | |
| mm2F1 | 4 | | 622F1 | 12 | |
| mm2Fm | 2 | | 622F2(s) | 6 | |
| 4F1 | 4 | | 6mmF1 | 12 | |
| 4̄F1 | 4 | | 6mmFm | 6 | |
| 4̄F2 | 2 | | 6̄m2F1 | 12 | |
| 422F1 | 8 | | 6̄m2Fm(s) | 6 | |
| 422F2(s) | 4 | | 6̄m2Fm(p) | 6 | |
| 4mmF1 | 8 | | 6̄m2Fmm2 | 3 | |
| 4mmFm | 4 | | 23F1 | 12 | |
| 4̄2mF1 | 8 | | 23F2 | 6 | MASD.[1] |
| 4̄2mF2(s) | 4 | | 23F3 | 4 | |
| 4̄2mFm | 4 | | 432F1 | 24 | |
| 4̄2mFmm2 | 2 | GMO, KDP. | 432F2(s) | 12 | |
| | | | 432F2(s) | 12 | |
| 3F1 | 3 | | 4̄3mF1 | 24 | |
| 32F1 | 6 | | 4̄3mFm | 12 | |
| 32F2 | 3 | | 4̄3mFmm2 | 6 | |
| 3mF1 | 6 | | 4̄3mF3m | 4 | |

[1] Methylammonium aluminum sulfate dodecahydrate and ammonium cadmium sulfate.

The applied electric field or stress and their types and directions causing transitions between two orientation states are determined for each of the 42 species.

Figure 5A:
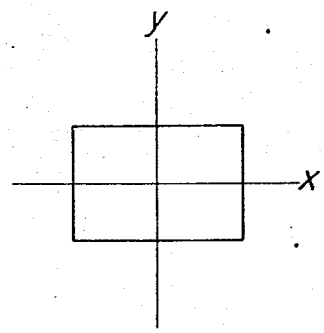
FIGS. 5(a) and (b) show states of orientation of a unit cell in the spontaneous state of a ferroelectric-ferroelastic material belonging to the species $\bar{4}2mFmm2$.
Figure 5B:
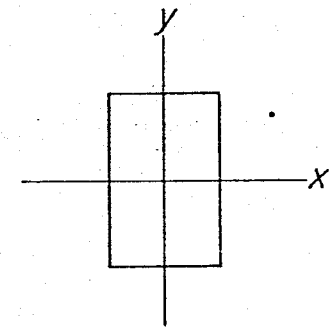

In the case of KDP which is an example of a ferroelectric-ferroelastic material belonging to 4̄2mFmm2 species, if the z axis is defined parallel to the 4̄ axis of symmetry of the paraelectric-paraelastic phase and $x$ and $y$ axes perpendicular to two mirror planes of symmetry, the $a$ and $b$ axes of the unit cell of the ferroelectric-ferroelastic material belonging to this species orientate as shown in FIGS. 5(a) and (b) (called "0" and "1" states respectively). The orientation of the spontaneous polarization is parallel with the z axis (i.e. perpendicular to the drawing paper), the direction being positive in the "1" state while negative in the "0" state. Transition from the "0" to the "1" state by an electric field is obtained by applying the field in the positive direction of the z axis. Transition from the "0" to the "1" state by a stress is obtained by applying a pressure to a crystal surface perpendicular to the $x$ axis or a tension to a crystal surface perpendicular to the $y$ axis, or a shear stress along a crystal surface making an angle with both $x$ and $y$ axes. Transition from the "1" to the "0" state by an electric field is obtained by applying the field in the negative direction of the z axis. Transition from the "1" to the "0" state by a stress is obtained by applying a pressure to a crystal surface perpendicular to the $y$ axis, a tension to a crystal surface perpendicular to the $x$ axis, both pressure and tension simultaneously, or a shear stress to a crystal surface making an angle with both $x$ and $y$ axes.

The GMO crystal structure $$(R_xR'_{1-x})_2O_3 \cdot 3Mo_{1-e}W_eO_3$$

(wherein R and R' are at least one rare earth element, $x=0\sim1.0$ and $e=0\sim0.2$) belongs to the orthorhombic system Pba2 and the point group mm2. KDP also belongs to the point group mm2 but has the Curie temperature $-150°$ C. and other practical defects. On the other hand, the GMO with the Curie temperature near 160° C. maintains the property of "ferroelectric-ferroelastic material" over a wide temperature range and a high conversion efficiency of mechanical to electrical energy. Therefore, the characteristic of GMO is excellent for a mechano-electrical coupling device.

Although this type of crystal has been previously described as monocrystal for example, in U.S. Pat. No. 3,437,432, the crystal structure of gadolinium molybdate with equal crystal lattice constants $a$ and $b$ disclosed there belongs neither to the point group mm2 nor to irregular ferroelectric materials. It does not even belong to the ferroelectric-ferroelastic materials in a broad sense.

Explanation of $$(R_xR'_{1-x})_2O_3 \cdot 3Mo_{1-e} \cdot W_eO_3$$

having the GMO structure and belonging to the point group mm2 will be made hereinafter.

Results of measurements by means of a triaxis X-ray goniometer and the X-ray diffraction method showed that $Gd_2(MoO_4)_3$ belonging to the rhombic system with the lattice constants $$a=10.38\pm0.005 \text{ A.}$$
$$b=10.426\pm0.005 \text{ A.}$$
$$c=10.709\pm0.005 \text{ A.}$$

and could be expressed by the space group Pba2 and the point group mm2.

$Eu_2(MoO_4)_3$, $Tb_2(MoO_4)_3$, $Dy_2(MoO_4)_3$ and $$Sm_2(MoO_4)_3$$

were isomorphs of $Gd_2(MoO_4)_3$, but the lattice constants measured by the X-ray diffraction method differed in the crystal lattice constants $a$ and $b$. All of these chemical compounds had the GMO crystal structure.

TABLE 2

| Sample | a (A.) | b (A.) | c (A.) |
|---|---|---|---|
| Eu₂(MoO₄)₃ | 10.377±0.005 | 10.472±0.005 | 10.655±0.005 |
| Gd₂(MoO₄)₃ | 10.388±0.005 | 10.426±0.005 | 10.709±0.005 |
| Dy₂(MoO₄)₃ | 10.331±0.005 | 10.366±0.005 | 10.603±0.005 |
| Sm₂(MoO₄)₃ | 10.478±0.005 | 10.511±0.005 | 10.856±0.005 |

The values of $(b-a)/2a$ for said $Eu_2(MoO_4)_3$, $$Gd_2(MoO_4)_3,$$

$Dy_2(MoO_4)_3$ and $Sm_3(MoO_4)_3$ are respectively in the ranges of 0.004 to 0.005, 0.0015 to 0.0023, 0.0012 to 0.002, and 0.0010 to 0.002.

The monocrystals of $Gd_2(MoO_4)_3$, $Sm_2(MoO_4)_3$, $$Du_2(MoO_4)_3,$$

$Tb_2(MoO_4)_3$ and $Dy_2(MoO_4)_3$ were cut out parallel to the (100), (010) and (001) surfaces which are perpendicular to their $a$, $b$ and $c$ axes, and treated by poling to get the single domain structure (this was checked under a polarization microscope by introducing polarized light in the direction of the axis and manipulating a crossed Nicol's prism). The intensity distribution of reflected light from various directions of the monocrystal was measured by an X-ray triaxis goniometer. The measurement was made on a reflection from the surfaces 200, 400, 600, 800, 10 0 0, and 12 0 0 and the surfaces 001, 002, 003, 004, 005, 006, 007, 008, 009, 0 0 10 and 0 0 11. Thereafter, a reverse voltage was applied in the direction of the c axis. After confirmation of the reversal of the $a$ and $b$ axes the intensity distributions of reflected light from the surfaces 020, 040, 060, 080, 0 10 0, and 0 12 0 were measured by the CuKd line with an X-ray iris slit of diversion 1°, a scattering slot of 1° and a receiving light slit of 0.1 mm. The voltage and the current of the X-ray source were 30 kv. and 10 ma. respectively. The scanning speed of the goniometer was 1/4°/min. and the radius of the Geiger counter was 185 mm.

Further, when the poling condition of the above GMO crystal is released, it becomes difficult to observe the difference between the crystal lattice constants $a$ and $b$. Furthermore, by using a single GMO crystal treated by poling as above mentioned in the mechano-electrical coupling devices illustrated in FIGS. 6 to 11, effect of the devices can be further improved.

The composite materials used in these devices are chemical compound monocrystals with the GMO crystal structure, chemical compound monocrystals, and their solid solution.

The results of measurements of several kinds of composite materials having the GMO crystal structure are shown in Table 2. The crystal structure used in this invention is affected by the dimension of used positive ions. If a positive ion is excessively large or small, the crystal varies its structure. The Arrhenium ionic radii of the rare earth ions are $Sm^{+3}$ 1.00 A., $Eu^{+3}$ 0.98 A., $Gd^{+3}$ 0.97 A., Tb 0.93 A. and Dy 0.92 A. Therefore $$(R_xR'_{1-x})_2O_3 \cdot 3Mo_{1-e}W_eO_3$$

(wherein R and R' are at least one rare earth element, $x=0-1.0$ and $e=0-0.2$) made by these positive ions form similar GMO structures. The dimensions of the crystal with the GMO structure belonging to the orthorhombic system and the point group mm2 which are used in this invention are $$a = 10.388 \pm 0.005 \text{ A.}$$
$$b = 10.426 \pm 0.005 \text{ A.}$$
$$c = 10.709 \pm 0.005 \text{ A.}$$

The spontaneous strain $x_S$ is given by $$x_S = \frac{b-a}{2a} > 1.0 \times 10^{-3}$$

Table 3 shows the properties of $Gd_2(MoO_4)_3$ used in this invention.

TABLE 3

Properties of $Gd_2(MoO_4)_3$

| | |
|---|---|
| Color | Colorless and transparent. |
| Density | 4,600 kg./m.² |
| Point group | Orthorhombic system mm2 ferroelectric-ferroelastic phase if T<Tc (Curie temperature) tetragonal system 42m, paraelastic phase if T>Tc. |
| Phase transition temperature | 162°±3° C. |
| Melting point | 1,170° C. |
| Cleavage surface | [110] and [001]. |
| Dielectric constant | $\epsilon a \cdot \epsilon b = 9.5$ $\epsilon c = 10.5$ at 20° C, ($\epsilon a$, $\epsilon b$ and $\epsilon c$ correspond to the $a$, $b$ and $c$ axes respectively). |
| Spontaneous polarization | $1.86 \times 10^{-5}$ (C./m.²) (direction of the c axis). |
| Spontaneous strain | $1.5 \times 10^{-3}$. |
| Modulus of elasticity | $3 \times 10^{-12}$ (m.²/newton). |
| Coercive electric field | $6 \times 10^3$ (v./m.). |
| Coercive stress | $1.4 \times 10^5$ (newton/m.²). |
| Electric resistivity | More than $10^{10}$ ohm cm. |
| Waterproof and chemical-proof properties | Strong. |
| Efflorescence and deliquescence properties | Null. |

Further, letting the electric capacitance connected to the crystal itself $C_o$ and the dielectric constant of free space $\epsilon_o$, the dielectric constant of crystal $\zeta$ becomes $$\zeta = \left(1 + \frac{C}{C_o}\right) \times \epsilon_o$$

When a force is applied to a ferroelectric-ferroelastic body, the force conversion obeys the relations of $$E = \frac{x_s}{P_s} X$$

and $$\langle P \rangle = \frac{\zeta x_s}{P_s}$$

where E is the electric field applied to the crystal, $x_s$ is the spontaneous strain and X is the stress. The energy conversion is represented by the relations of $$\zeta = \frac{P_s^2}{x_s X}$$

and $$\frac{W_{elec}}{W_{mech}} = \frac{1}{1 + \left(\frac{P_s}{x_s}\right) X}$$

where $W_{elec}$ in the electric energy conversion and $W_{mech}$ is the mechanical energy conversion.

For the purpose of comparison, the force conversion and energy conversion of the conventional piezoelectric crystals are given by $$E = \frac{d}{\kappa^X + \zeta} X$$

$$P = \frac{d}{\kappa^X + \zeta}$$

$$\zeta = \kappa^X$$

$$W_{elec} = \left(\frac{d^2}{8\kappa^X}\right) X^2$$

and $$\frac{W_{elec}}{M_{elec}} = \frac{1}{\frac{4\kappa^X \cdot S^E}{d^2} - 2}$$

where $\kappa^X$ is the electric susceptibility under a constant stress in the conditions of E=0 and X=0, d is the piezoelectric modulus, and $S^E$ is the elastic compliance under a constant field.

Next, the manufacturing method of the GMO crystal will be explained by examples.

EXAMPLE 1

$Gd_2O_3$ 361.8 g. and $MoO_3$ 431.7 g. were mixed to form a pellet under a suitable pressure. The $Gd_2(MoO_4)_3$ disc was put in a platinum crucible, or put on a platinum plate in an alumina crucible and heated at 700° C. for a few hours in an electric furnace. The sample was taken out of the furnace, powdered, stirred, and pressurized again. The $Gd_2(MoO_4)_3$ disc was put in a crucible and heated at 1000° C. for two to four hours in the electric furnace. The product was measured by the powder X-ray diffraction method and was found to have the GMO crystal structure.

Further, the $Gd_2(MoO_4)_3$ powder obtained above was put in the platinum crucible and fused at about 1190° C. A platinum wire of 1 mm.φ as a seed crystal was dipped in the $Gd_2(MoO_4)_3$ solution. The temperature was lowered until the fused solution became solid on the wire. The revolution of platinum wire was 30–60 revolutions/min. Next the platinum wire was pulled up at a rate of 1.5 to 18 mm./hr. The input to the induction coil was increased until the diameter of the crystal became about 1 mm. In this case, the input to the furnace was controlled so that the diameter of the crystal became 10 to 15/mm., the crystal of 1 mm.φ being used as a seed crystal. The pulling speed was also 1.5 to 18 mm./hour. When the crystal grew about 30 to 79 mm.φ, it was cut out from the $Gd_2(MoO_4)_3$ solution. The cut-out crystal was put in an after-heater and the temperature was lowered at a rate of 50 to 100° C./hour to prevent the occurrence of cracks in the crystal. The product thus obtained was identified as $Gd_2(MoO_4)_3$ belonging to the orthorhombic system and the point group mm2, and employed in this invention. As will be appreciated by those skilled in the art, the presence of impurities in crystals can produce differences in the properties of the crystals which have been produced from nominally the same mixture. In the present invention the production of a crystal having unequal $a$ and $b$ lattice constants as compared with known crystals having equal $a$ and $b$ lattice constants, for example, as disclosed in U.S. Pat. No. 3,437,432 is enabled by ensuring that components used in the orginal mixture are as pure as possible and by omitting to add a binder, for example, paraffin, which can be a source of additional impurities. A crystal having unequal $a$ and $b$ lattice constants will exhibit ferroelectric-ferroelastic properties, whilst a crystal having equal $a$ and $b$ lattice constants will not have these properties.

The U.S. Pat. 3,437,432 claims to the subject of a single crystal having the chemical composition expressed by $$(R_xR'_{1-x})_2O_3 \cdot 3Mo_{1-e}W_eO_3,$$

where R and R' are at least one rare earth element, $x$ is 0 to 1.0 and $e$ is 0 to 0.2. But only the case that the lattice constants $a$ and $b$ thereof are equal is disclosed in the patent. In analyzing the crystal structure of the gadolinium molybdate (GMO) single crystal, same X-ray diffraction techniques are employed in the patent and the present invention. That is, the crystal compound produced by the invention has been determined on a "Norelco" (trademark) X-ray diffractometer, such as disclosed in the U.S. patent, in column 3, lines 53 to 44 under the equal accuracy in measurement. That is, the error in measurement of $\pm 0.005$ A. is equal between the patent and the present invention. Under such equal conditions in measurement, the following differences are found therebetween.

| U.S. Pat. 3,437,432 | This invention |
|---|---|
| $a = 10.369 \pm 0.005$ A. | $a = 10.388 \pm 0.005$ A. |
| $b = 10.369 \pm 0.005$ A. | $b = 10.426 \pm 0.005$ A. |
| $c = 10.672 \pm 0.005$ A. | $c = 10.709 \pm 0.005$ A. |

Thus, both gadolinium molybdate single crystals are concluded to have different lattice constants.

It is essential that as previously disclosed in the present specification, the anomalous distortion disappears even if the spontaneous polarization is reversed in case the crystal structure has the lattice constants $a=b$, and hence, the GMO single crystal having such property can not be used as a mechanoelectrical coupling element.

The grounds of the above-mentioned differences in the lattice constants of a unit cell along $a$ and $b$ axes are as follows:

(a) In this invention, the monocrystals of $MoO_3$ of no less than 99.999% in purity and $Gd_2O_3$ of no less than 99.9% are employed as the host material of the GMO crystal compound, so that such $MoO_3$ and $Gd_2O_3$ are hardly subjected to influences due to the addition of impurities such as Al, Se, Ga and W which may cause a danger of reducing the difference between the lattice constants $a$ and $b$.

(b) The U.S. patent uses paraffin as a binder as disclosed in column 8, lines 19–24. It is considered that the dissolution of the paraffin reduces the difference between the lattice constants $a$ and $b$ due to the addition of impurities.

(c) In the U.S. patent, furthermore, the used pellet is heated once from room temperature to 900° C., so that a full reaction for providing the intended single crystal can not be completed since $Gd_2O_3$ melts down into a fused solution of $MoO_3$, resulting in a single crystal having a low melting point and having a colored portion therein.

On the other hand, the crystal compound according to this invention, as disclosed in the present specification, is fabricated by the steps comprising at first heating $Gd_2(MoO_4)_3$ to 700° C., pulverizing it in powdered form and heating again the powder at 1000° C. in a crucible, thus resulting a transparent GMO single crystal having a high melting point of 1170° C.

EXAMPLES 2–49

The method described in Example 1 was used for manufacturing monocrystals as shown in Table 4. The amount of reactants as shown in this table were heated just under the melting point to form a solid solution.

Next these chemical compounds were heated. Monocrystals were pulled up from the fused solution as described in Example 1.

TABLE 4

| Monocrystal | Molybdate, part | Rare earth oxide, part | | | |
|---|---|---|---|---|---|
| $Sm_2(MoO_4)_3$ | 431.8 | $(Sm_2O_3)$ 348.7 | | | |
| $Eu_2(MoO_4)_3$ | 431.8 | $(Eu_2O_3)$ 352.0 | | | |
| $Dy_2(MoO_4)_3$ | 431.8 | $(Dy_2O_3)$ 373.0 | | | |
| $Tb_2(MoO_4)_3$ | 863.6 | $(Tb_4O_7)$ 748.8 | | | |
| $(Gd_{0.5}Sm_{0.5})_2(MoO_4)_3$ | 431.8 | $(Gd_2O_3)$ 180.9 | $(Sm_2O_3)$ 174.3 | | |
| $(Gd_{0.5}Eu_{0.5})_2(MoO_4)_3$ | 431.8 | $(Gd_2O_3)$ 180.9 | $(Eu_2O_3)$ 176.0 | | |
| $(Gd_{0.5}Tb_{0.5})_2(MoO_4)_3$ | 431.8 | $(Gd_2O_3)$ 180.9 | $(Tb_4O_7)$ 187.2 | | |
| $(Gd_{0.5}Dy_{0.5})_2(MoO_4)_3$ | 431.8 | $(Gd_2O_3)$ 18.9 | $(Dy_2O_3)$ 186.5 | | |
| $(Gd_{0.95}Yb_{0.05})_2(MoO_4)_3$ | 431.8 | $(Gd_2O_3)$ 343.7 | $(Yb_2O_3)$ 19.7 | | |
| $(Gd_{0.95}Ho_{0.05})_2(MoO_4)_3$ | 431.8 | $(Gd_2O_3)$ 343.7 | $(Ho_2O_3)$ 18.9 | | |
| $(Gd_{0.95}Lu_{0.05})_2(MoO_4)_3$ | 431.8 | $(Gd_2O_3)$ 343.7 | $(Lu_2O_3)$ 19.9 | | |
| $(Gd_{0.95}Tm_{0.05})_2(MoO_4)_3$ | 431.8 | $(Gd_2O_3)$ 343.7 | $(Tm_2O_3)$ 19.3 | | |
| $(Gd_{0.95}Sc_{0.05})_2(MoO_4)_3$ | 431.8 | $(Gd_2O_3)$ 343.7 | $(Sc_2O_3)$ 6.9 | | |
| $(Gd_{0.95}La_{0.05})_2(MoO_4)_3$ | 431.8 | $(Gd_2O_3)$ 343.9 | $(La_2O_3)$ 16.3 | | |
| $(Gd_{0.95}Pr_{0.05})_2(MoO_4)_3$ | 431.8 | $(Gd_2O_3)$ 343.9 | $(Pr_6O_{11})$ 17.0 | | |
| $(Gd_{0.6}Y_{0.4})_2(MoO_4)_3$ | 431.8 | $(Gd_2O_3)$ 217.0 | $(Y_2O_3)$ 90.3 | | |
| $(Gd_{0.6}La_{0.4})_2(MoO_4)_3$ | 431.8 | $(Gd_2O_3)$ 217.0 | $(La_2O_3)$ 130.0 | | |
| $(Gd_{0.60}Tb_{0.20}Dy_{0.20})_2(MoO_4)_3$ | 431.8 | $(Gd_2O_3)$ 217 | $(Dy_2O_3)$ 74.6 | $(Tb_4O_7)$ 78.8 | |
| $(Gd_{0.70}Eu_{0.20}Dy_{0.10})_2(MoO_4)_3$ | 431.8 | $(Gd_2O_3)$ 253.3 | $(Eu_2O_3)$ 70.4 | $(Dy_2O_3)$ 37.3 | |
| $(Gd_{0.60}Sm_{0.20}Tb_{0.20})_2(MoO_4)_3$ | 431.8 | $(Gd_2O_3)$ 217.0 | $(Sm_2O_3)$ 69.7 | $(Tb_4O_7)$ 39.4 | |
| $(Gd_{0.70}Eu_{0.20}Tb_{0.10})_2(MoO_4)_3$ | 431.8 | $(Gd_2O_3)$ 253.3 | $(Eu_2O_3)$ 70.4 | $(Tb_4O_7)$ 39.4 | |
| $(Gd_{0.7}Y_{0.2}La_{0.1})_2(MoO_4)_3$ | 431.8 | $(Gd_2O_3)$ 253.3 | $(La_2O_3)$ 32.6 | $(Y_2O_3)$ 45.2 | |
| $(Gd_{0.7}Eu_{0.2}Ho_{0.1})_2(MoO_4)_3$ | 431.8 | $(Gd_2O_3)$ 253.3 | $(Eu_2O_3)$ 70.4 | $(Ho_2O_3)$ 37.8 | |
| $(Gd_{0.7}Sm_{0.1}Eu_{0.1}Y_{0.1})_2(MoO_4)_3$ | 431.8 | $(Gd_2O_3)$ 253.3 | $(Sm_2O_3)$ 34.9 | $(Eu_2O_3)$ 35.2 | $(Y_2O_3)$ 22.6 |
| $(Gd_{0.95}Nd_{0.05})_2(MoO_4)_3$ | 431.8 | $(Gd_2O_3)$ 343.7 | $(Nd_2O_3)$ 16.8 | | |
| $(Gd_{0.6}Tb_{0.2}Y_{0.1}La_{0.1})_2(MoO_4)_3$ | 431.8 | $(Gd_2O_3)$ 217.0 | $(Tb_4O_7)$ 39.4 | $(La_2O_3)$ 32.6 | |
| $Gd_2(Mo_{0.9}W_{0.1}O_4)_3$ | 388.6 | $(WO_3)$ 70.0 | $(Gd_2O_3)$ 361.8 | | |
| $(Sm_{0.5}Eu_{0.5})_2(MoO_4)_3$ | 431.8 | $(Sm_2O_3)$ 174.1 | $(Eu_2O_3)$ 176.0 | | |
| $(Sm_{0.5}Dy_{0.5})_2(MoO_4)_3$ | 431.8 | $(Sm_2O_3)$ 174.1 | $(Dy_2O_3)$ 186.5 | | |
| $(Sm_{0.5}Tb_{0.5})_2(MoO_4)_3$ | 431.8 | $(Sm_2O_3)$ 174.1 | $(Tb_4O_7)$ 187.2 | | |
| $(Sm_{0.95}Yb_{0.05})_2(MoO_4)_3$ | 431.8 | $(Sm_2O_3)$ 331.3 | $(Yb_2O_3)$ 19.7 | | |
| $(Sm_{0.95}Ho_{0.05})_2(MoO_4)_3$ | 431.8 | $(Sm_2O_3)$ 331.3 | $(Ho_2O_3)$ 18.9 | | |
| $(Sm_{0.95}Lu_{0.05})_2(MoO_4)_3$ | 431.8 | $(Sm_2O_3)$ 331.3 | $(Lu_2O_3)$ 19.9 | | |
| $(Sm_{0.95}Tm_{0.05})_2(MoO_4)_3$ | 431.8 | $(Sm_2O_3)$ 331.3 | $(Tm_2O_3)$ 19.3 | | |
| $(Sm_{0.95}Sc_{0.05})_2(MoO_4)_3$ | 431.8 | $(Sm_2O_3)$ 331.3 | $(Sc_2O_3)$ 6.9 | | |
| $(Sm_{0.95}Y_{0.05})_2(MoO_4)_3$ | 431.8 | $(Sm_2O_3)$ 331.3 | $(Y_2O_3)$ 11.3 | | |
| $(Sm_{0.9}Er_{0.1})_2(MoO_4)_3$ | 431.8 | $(Sm_2O_3)$ 313.4 | $(Er_2O_3)$ 19.1 | | |
| $(Sm_{0.6}Eu_{0.3}Er_{0.1})_2(MoO_4)_3$ | 431.8 | $(Sm_2O_3)$ 209.4 | $(Eu_2O_3)$ 105.4 | $(Er_2O_3)$ 19.1 | |
| $(Sm_{0.7}Tb_{0.2}Y_{0.1})_2(MoO_4)_3$ | 431.8 | $(Sm_2O_3)$ 244.0 | $(Tb_4O_7)$ 78.8 | $(Y_2O_3)$ 22.6 | |
| $(Sm_{0.8}Er_{0.1}Y_{0.1})_2(MoO_4)_3$ | 431.8 | $(Sm_2O_3)$ 278.9 | $(Y_2O_3)$ 22.6 | $(Er_2O_3)$ 19.1 | |

TABLE 4—Continued

| Monocrystal | Molybdate, part | Rare earth oxide, part | | | |
|---|---|---|---|---|---|
| $(Sm_{0.8}Dy_{0.1}Y_{0.05}Er_{0.05})_2 \cdot (MoO_4)_3$ | 431.8 | $(Sm_2O_3)$ 278.9 | $(Dy_2O_3)$ 37.3 | $(Y_2O_3)$ 11.3 | $(Er_2O_3)$ 9.5 |
| $(Sm_{0.5}Tb_{0.5})_2 \cdot (Mo_{0.90}W_{0.1})_3$ | 388.6 | $(WO_3)$ 70.0 | $(Sm_2O_3)$ 174.1 | $(Tb_4O_7)$ 187.2 | |
| $(Dy_{0.95}La_{0.05})_2 \cdot (MoO_4)_3$ | 431.8 | $(Dy_2O_3)$ 369.3 | $(La_2O_3)$ 16.3 | | |
| $(Dy_{0.95}Pr_{0.05})_2 \cdot (MoO_4)_3$ | 431.8 | $(Dy_2O_3)$ 369.3 | $(Pr_6O_{11})$ 17.0 | | |
| $(Dy_{0.95}Nd_{0.05})_2 \cdot (MoO_4)_3$ | 431.8 | $(Nd_2O_3)$ 16.8 | $(Dy_2O_3)$ 369.3 | | |
| $(Dy_{0.8}Nd_{0.10}Ho_{0.10})_2 \cdot (MoO_4)_3$ | 431.8 | $(Dy_2O_3)$ 298.4 | $(Ho_2O_3)$ 37.8 | $(Nd_2O_3)$ 33.7 | |
| $(Eu_{0.4}Tb_{0.26}Dy_{0.2})_2 \cdot (MoO_4)_3$ | 431.8 | $(Eu_2O_3)$ 211.2 | $(Dy_2O_3)$ 74.6 | $(Tb_4O_7)$ 78.8 | |
| $(Gd_{0.4}Eu_{0.2}Sm_{0.1}Tb_{0.1}Dy_{0.1})_2 \cdot (MoO_4)_3$ | 431.8 | $(Gd_2O_3)$ 217.0 | $(Sm_2O_3)$ 34.9 | $(Eu_2O_3)$ 70.4 | $(Dy_2O_3)$ 37.3 $(Tb_4O_7)$ 39.4 |

Embodiments of the use of ferro electric-ferro-elastic material belonging to the $\overline{4}2Fmm2$ species will be described hereafter. $Gd_2(MoO_4)_3$ will be simply abbreviated as GMO.

EMBODIMENT 1

Figure 6A:
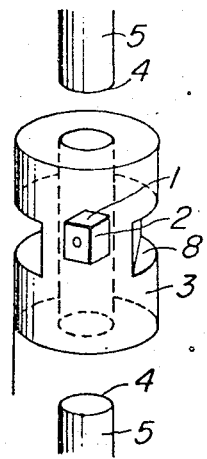
FIGS. 6(a) and (b) are side and lateral cross-sectional views showing a mechano-electrical coupling device using a compound crystal made in accordance with the present invention.
Figure 6B:
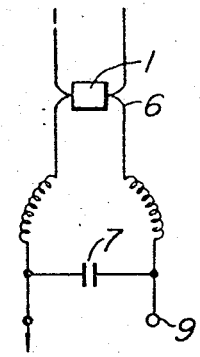

As shown in FIGS. 6(a) and (b), a 5 mm. cube 1 of 45 z cut KDP (cut parallel to the surfaces (001), (110) and ($1\bar{1}0$) whose (001) surface was fitted with an electrode 2 was disposed in a hollow cylindrical pressure cell 3 made of pyroferrite. The arrangement was dipped in liquid nitrogen to be maintained at an extremely low temperature. A window 8 was provided in the pyroferrite arrangement to promote a rapid permeation of liquid nitrogen and to fix a contact spring 6 (see FIG. 6(b)) easily. A pressure of the order of 100 kg./cm.² was applied to the arrangement through the end faces 4 of pressure rod 5. A voltage of the order of 5000 volts could be applied to the electrode 2. As shown by the schematic diagram in FIG. 6(b), a capacitor 7 of the order of 380 pf. was connected in parallel with the KDP cube 1 by way of the contact spring 6, obtaining an electrical energy of $6 \times 10^{-3}$ joule.

As pointed out above a single GMO crystal may be used as alternative to KDP.

EMBODIMENT 2

Figure 7:
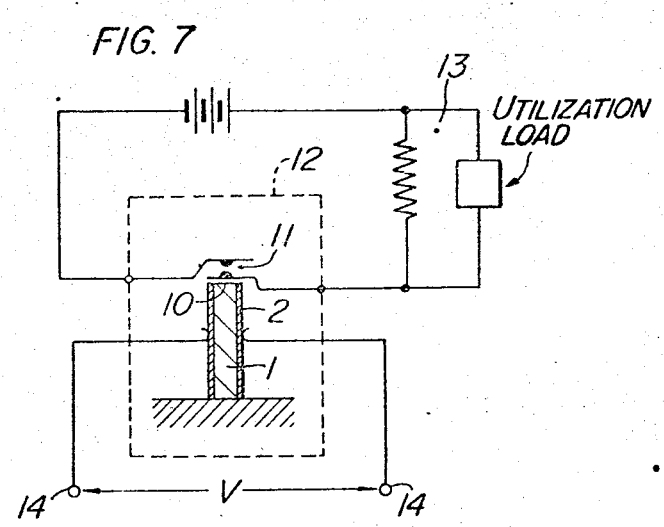
FIG. 7 is an explanatory view of a piezoelectric relay using a ferroelectric-ferroelastic material belonging to the $\bar{4}2mFmm2$ species.

As shown in FIG. 7, a z cut KDP element 1 with the dimension of 0.5 mm thickness, 2 mm width and 15 mm length (cut perpendicularly to the c axis) whose (001) surface was fitted with electrodes 2 on both sides, another surface 10 being fitted with a relay contact portion 11, was disposed in a low temperature bath using for example liquid nitrogen. When a relay circuit 13 was connected to the contact portion 11 and a voltage $V$ of 50 volts was applied across the electrodes 2 by way of the terminals 14, a polarization change was caused in the KDP element 1. As the KDP crystal 1 expanded in the direction of the contact portion and closed it, a current flowed through the relay circuit 13. When a reverse voltage of $-50$ volts was applied, the crystal contracted in the direction of the contact portion so that the relay was cut off. Therefore, the polarization change of KDP by an electric field could be utilized to make a self-keeping type piezoelectric relay. The driving element for such piezoelectric relay could be made of ferroelectric-ferroelastic material crystals including not only KDP but also GMO.

EMBODIMENT 3

Figure 8:
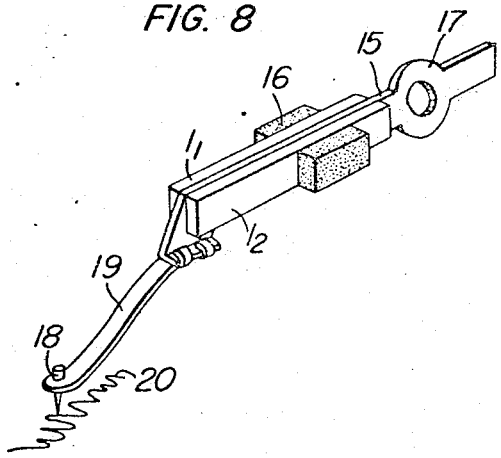
FIG. 8 shows a bimorph type piezoelectric vibrator using a ferroelectric-ferroelastic material belonging to the $\bar{4}2mFmm2$ species.

As shown in FIG. 8, z cut GMO thin plates $1_1$ and $1_2$ (cut perpendicularly to the c axis) were bonded on both sides of a metal piece 15 with their c axes arranged in the same or the opposite direction thereby to form a bimorph. One end 17 of the metal piece 15 was fixed while the other end was fixed with a cantilever element 19 having a sapphire needle 18 fixed in the free end thereof. Rubber dampers 16 were provided on both sides of the metal piece 15 on the plates $1_1$ and $1_2$. When the pick-up thus constructed was moved along a groove 20, a bending moment was given to the bimorph. A polarization change was generated in GMO corresponding to the amount of bending, and a variation in electrical energy was generated on the surfaces of GMO plates $1_1$ and $1_2$.

Figure 9:
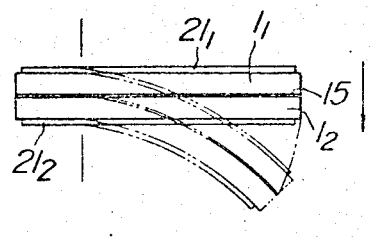
FIG. 9 and 10 show how the bimorph type vibrator shown in FIG. 8 operates in different ways of piling thin crystal plates.
Figure 10:
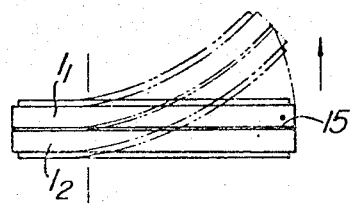

(1) When the GMO plates are bonded on both sides of the metal piece 15 with their c axes arranged in the same direction as shown in FIG. 9, a voltage appeared across the electrodes $21_1$ and $21_2$. Since the bending of GMO plates $1_1$ and $1_2$ and hence their polarization changes were proportional to the amplitude of the groove, a voltage proportional to the amplitude of the groove could be obtained.

(2) When the z cut GMO crystals were bonded on both sides of the metal piece 15 with their c axes arranged in the opposite direction and a pressure was given to the GMO plates $1_1$ and $1_2$, a voltage was generated in accordance with the principle as described in (1).

EMBODIMENT 4

Figure 11A:
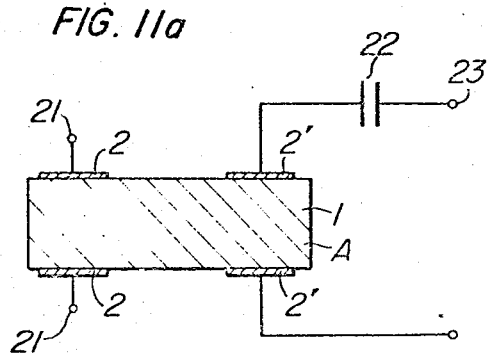
FIGS. 11(a) and (b) are longitudinal cross-sectional and plan views of a piezoelectric transformer using a compound crystal made in accordance with the present invention.
Figure 11B:
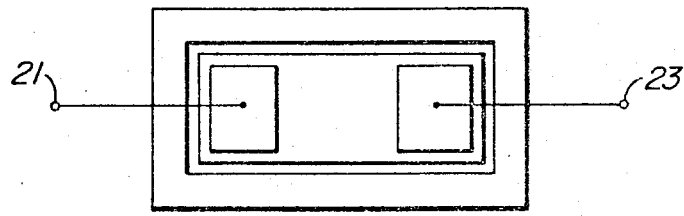

As shown in FIGS. 11(a) and (b), a 45° z cut GMO piece 1 (cut in parallel with the (001) and (110) surfaces being perpendicular to the c axis) with dimensions of 0.2 mm. in thickness, 20 mm. in length and 1.5 mm. in width was fitted with two pairs of electrodes 2 and 2' on both sides of the (001) surface and a capacitor 22 of 0.1 µf. on the side of the electrode 2'. When an AC voltage of 100 v. and 50 Hz. was applied to the primary terminals of electrode 21, a voltage was induced in the domain A of the GMO piece 1 and caused a variation in the spontaneous polarization. An electrical energy was generated in the secondary electrodes 2', yielding a voltage of 50 Hz. and 2 v. on the secondary terminal 23.

The ferroelectric-ferroelastic materials as used in the above embodiments can be employed in a mechano-electrical coupling device utilizing the polarization change of the crystals which preferably have the GMO crystal structure

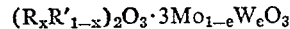

(wherein R and R' are at least one rare earth element, $x = 0-1.0$ and $e = 0-0.2$) belonging to the orthorhombic system and the point group mm2.

We claim:
1. A compound ferroelectric-ferroelastic crystal of

having the gadolinium molybdate crystal structure belonging to the orthorhombic system and the point group mm2 in which the spontaneous strain of the crystal has a value more than $1.0 \times 10^{-3}$ said crystal having lattice constants of $a = 10.388 \pm 0.005$ A., $b = 10.426 \pm 0.005$ A. and $c = 10.709 \pm 0.005$ A.

2. A compound ferroelectric-ferroelastic crystal of $Sm_2(MoO_4)_3$ having the gadolinium molybdate crystal structure belong to the orthorhombic system and the point group mm2 in which the spontaneous strain of the crystal has a value more than $1.0 \times 10^{-3}$, said crystal having lattice constants of $a = 10.478 \pm 0.005$ A., $b = 10.511 \pm 0.005$ A., and $c = 10.856 \pm 0.005$ A.

3. A compound ferroelectric-ferroelastic crystal of $Eu_2(MoO_4)_3$ having the gadolinum molybdate crystal structure belonging to the orthorhombic system and the point group mm2 in which the spontaneous strain of the crystal has a value more than $1.0 \times 10^{-3}$, said crystal having lattice constants of $a = 10.377 \pm 0.005$ A., $b = 10.472 \pm 0.005$ A. and $c = 10.655 \pm 0.005$ A.

4. A compound ferroelectric-ferroelastic crystal of $Dy_2(MoO_4)_3$ having the gadolium molybdate crystal structure belonging to the orthorhombic system and the point group mm2 in which the spontaneous strain of the crystal has a value more than $1.0 \times 10^{-3}$, said crystal having lattice constants of $a = 10.331 \pm 0.005$ A., $b = 10.336 \pm 0.005$ A., and $c = 10.603 \pm 0.005$ A.

References Cited
UNITED STATES PATENTS
3,437,432  4/1969  Borchardt _____ 252—62.9 X OSCAR R. VERTIZ, Primary Examiner J. COOPER, Assistant Examiner U.S. Cl. X.R.

423—593; 252—62.9